United States Patent [19]

Zerle et al.

[11] Patent Number: 4,673,803
[45] Date of Patent: Jun. 16, 1987

[54] METHOD OF DETECTING AND EVALUATING IDENTIFICATION CODES ON CONTINUOUSLY MOVING WEBS

[76] Inventors: Ludwig Zerle, Paarstr. 3, 8905 Mering; Gerhard Brunner, Jägerbachstr. 4; Otto Lorenz, Schwibbogenplatz 2b, both of 8900 Augsburg, all of Fed. Rep. of Germany

[21] Appl. No.: 673,781

[22] Filed: Nov. 21, 1984

[30] Foreign Application Priority Data

Nov. 22, 1983 [DE] Fed. Rep. of Germany ....... 3342038

[51] Int. Cl.⁴ .............................................. G06K 7/00
[52] U.S. Cl. ................................... 235/436; 235/375; 235/474
[58] Field of Search .............. 235/436, 440, 441, 494, 235/474, 375

[56] References Cited

U.S. PATENT DOCUMENTS

| | | | |
|---|---|---|---|
| 3,227,884 | 1/1966 | Rantsch et al. | 235/440 |
| 3,705,416 | 12/1972 | Head | 235/436 |
| 4,041,279 | 8/1977 | Foote | 235/440 |
| 4,195,772 | 4/1980 | Nishimura | 235/441 |

FOREIGN PATENT DOCUMENTS 2747076 10/1977 Fed. Rep. of Germany .
1951713 3/1978 Fed. Rep. of Germany .

*Primary Examiner*—David L. Trafton
*Attorney, Agent, or Firm*—Karl F. Ross; Herbert Dubno

[57] ABSTRACT

Identification marks in the form of code fields are arranged on a material band which is adapted to be moved in a continuous manner. These identification marks are recognized by a reader head with a subsequent evaluating logic, whereby under conditions of signal flow produced by the reader head on passing of the code field at the evaluating logic, this signal flow is transformed into identification marking corresponding to the respective code field. Each code field is preceded by a starter label which produces a start signal causing the release of the initially blocked signal flow between the reader head and the evaluating logic and actuates a switch component to assume a transmitting condition. On completion of the signal flow transformation into the identification marking, the signal flow ceases due to actuation of the switch component.

12 Claims, 2 Drawing Figures

METHOD OF DETECTING AND EVALUATING IDENTIFICATION CODES ON CONTINUOUSLY MOVING WEBS

FIELD OF THE INVENTION

Our present invention relates to improvements in or relating to a method for the recognition, detection and evaluation, and scanning, comprehending, or processing identification codes on a continuously moving web of a generally flexible material (e.g. a fabric).

BACKGROUND OF THE INVENTION

A web of fabric or other flexible material can carry code marks in the form of code fields. The methods hitherto in use for "reading" the fields encompass the use of a reading device comprised of a reader head and an evaluating logic or system. The signal flow produced at the reader head when code fields pass underneath it in such methods is passed to and converted by the evaluating logic into the pertaining identification mark or marking in conformity with the pertaining code field.

Methods of this type are particularly known in textile manufacturing and upgrading industries. Such methods allow automated processing and process control, as well as optimization of operations, through the use of electronics and data processing, such that the completion of job orders can be done more efficiently while making optimal use of the available means of production.

Identification marks on the material web enable the automatic recognition, sensing, or scanning of moving web sections or portions, and the completion-control as a function of the identified markings or codes. Also, the continuous monitoring of the entire production sequence, treatment sequence, or flow is made possible in this manner.

In general terms, the sensing or recognition of the identification marks is carried out in such a way that the reader head substantially continuously scans the moving material over that width of the material which assuredly contains the code fields. The code fields may be formed, for example, by sections of a piece of cloth and/or plastic/synthetic foil or laminate, with a coding in the form of a scanning pattern made up of perforations, lines, or the like.

The signal flow produced as a result of the scanning or sensing operation is processed in the evaluating logic and is converted into the identification marking contained in the pertaining code field that is being scanned, and the identification marking is subsequently further processed through a computer, data processor, or the like.

The signal flow is continuous even in the absence of passage of code fields at the reader head, due to irregularities, defects, disruptions and the like in the surface of the web passing at the reader head, or due to holes, tears and the like in the web in general. Thus, the evaluating logic is required to continuously examine the signal flow and to determine whether or not the information at hand contains an actual identification, i.e., the logic is required to carry out a full signal processing even in the absence of code fields on the material which is being scanned during passage beneath the reader head. This requires a high data retention and processing capacity in the evaluating logic which may become overloaded with stray data at any time in such a way that the commencement of transmission and adequate recognition of useful data is obstructed. Saturation of the logic capacity by spurious marks which are not part of a code field are a major problem.

OBJECTS OF THE INVENTION

It is therefore a general object of the invention to provide an improved method which substantially prevents the overloading of the evaluating logic by a signal flow which is not relevant prior to processing of useful data of an identification mark or marking It is also an object of the present invention to provide a method which increases the capacity of the evaluating logic to such an extent that it responds substantially to actual identification marking.

Yet another object is to provide a method of operating a code-field reader for textile, synthetic resin and like webs so that the dimensions and capacity of the information processing elements thereof can be restricted to only that which is absolutely necessary to process the coded information so that excess capacity which may be required when spurious signals are processed will not be necessary.

SUMMARY OF THE INVENTION

In accordance with one aspect of the present invention these objects are attained thereby that a starter mark, label, or similar identifier, is associated with each code field arranged on the material web, and produces a start or initiating signal immediately prior to commencement of passage of the code field at the reader head. The initiating signal causes the release of the initially disrupted signal flow between the reader head and the evaluating logic, and the signal flow is blocked or discontinued when the conversion or transformation operation of the signal flow into the identification mark is completed.

In accordance with a preferred embodiment of the invention the starter label immediately precedes each code field, when viewed in the direction of travel of the material, and the initiating signal is produced by a detector at the reader head which detector is responsive to the starter label.

The advance in the art provided by the invention resides generally therein that the evaluating logic is only operational or loaded by the signal flow on passage of a code field at the reader head. The evaluating logic is then independently of the preceding signal flow and to the fullest extent available for the evaluation of the identification mark and need only to be designed in its signal processing capacity for the signal flow which is presented for such evaluation. The initiating signal is not formed by code elements of the code field per se under reading or scanning by the reader head, but is produced by the starter labels which are fully independent of the code fields and the associated information content thereof, and the starter labels are scanned or detected by a dedicated detector which, in turn, is independent of the reader head and the evaluating logic. The detector, accordingly, is continuously at the ready operationally, but nevertheless need only be furnished with a very low signal processing capacity because the signals intended for it are only present in a small signal band or range and can hardly be obscured by other signals.

It is also preferred that the starter labels extend in the form of lines or bands in transverse direction with respect to the direction of travel of the web or material and over the width of the pertaining code field. This eliminates localized, precise positioning of the detector with respect to the course of the material, especially with respect to the portion thereof which contains the code fields.

It is further preferred that the starter labels are formed by electrically conductive and/or magnetizable material, and that the detector is formed by an electric or magnetic proximity switch which is adapted to be operating substantially without contact with the material or code fields.

It is also preferred that the starter markings or labels are repeated in each code field, when viewed in the direction of travel of the material. The initiating signals which, accordingly, are repeated during the passing of a code field can then be processed in the sense of an additional signal recognition and can accordingly contribute considerably to the certainty of the signal recognition or scanning. In a simple manner, such a repetition of the starter labels can be obtained thereby that at or in one code field, which field is formed by a piece of cloth or fabric connected to the material or web, the starter markers are formed by metal threads, filaments, or encapsulated wires or the like conductors.

It is further within the scope of this invention that the starter labels and with them a pertaining initiating signal per se, are coded and that such codes or codings are scanned and processed in the sense of multiples of the base code contained in a code field. This enables the differentiation between the initiating signals and an attribution thereof to the identification markings, in groups, to the various initiating signals. In general the starter markings and/or the code markings may be conductive or magnetically sensible, although optical responsive code fields may be used also.

BRIEF DESCRIPTION OF THE DRAWING

The above and other objects, features and advantages will become apparent from the following description, reference being made to the accompanying drawing in which.

SPECIFIC DESCRIPTION

Figure 1:
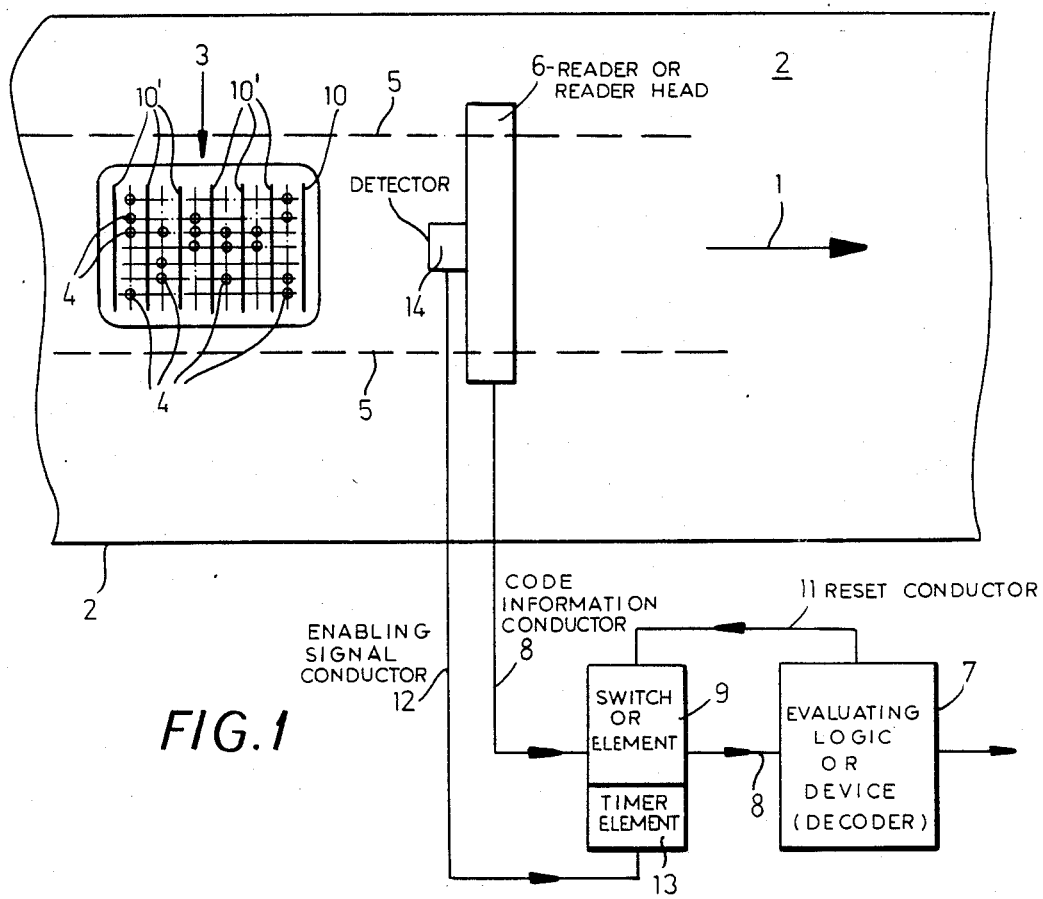
FIG. 1 is a schematic representation of one arrangement adapted to carry out one method in accordance with the invention.

In FIG. 1, the arrow 1 designates the direction of travel of a material bank, web, or strip of material 2 which is moved in a substantially continuous manner from the left to the right.

The web 2 carries on it a code field 3 with a coding in the shape of a scanning pattern whereby holes 4 arranged at the scanning or raster points form the code elements.

Several of such code fields 3, together with respectively other coding for identification of various succeeding web portions, can be arranged over the length and breadth of strip 5 which is shown in dash outline in web 1 in FIG. 1.

The identification marking or mark embodied in the code fields 3 is scanned, read, or otherwise comprehended in a reader device or monitor, comprised of a reader head 6 and an evaluating device 7, generally referred to as evaluating logic. The signal flow which is produced at the reader head 6 on passing of code fields 3 thereat, is passed to the logic 7 via code information conductor 8 with a switch element 9 being arranged between the reader head 6 and the logic 7. The switch 9 can allow release or passage, and cessation or stopping, of the signal flow in conformity with its setting. The admitted signal flow is converted in the logic 7 into the pertaining identification marking of the respective code field 3.

For consequential actuation of the switch 9, which can allow passage of the signal flow as well as disruption of the signal flow, each code field 3 is furnished with at least one starter mark or label 10 which immediately prior to commencement of passing of the code field 3 produces a start or initiating signal at the reader head 6.

The initiating signal controls the switch 9 in such a way that a signal flow between the reader head 6 and the logic 7 is released, whereas the signal flow was initially stopped. When the conversion of the released signal flow into the identification marking is complete the signal flow is stopped by the switch 9.

This may be accomplished, for example, via a reset command via conductor 11 which transmits a control impulse to set the switch 9 so as to block signal flow when the logic 7 indicates signal flow conversion is complete, i.e., the presence of a complete identification marking.

It is, of course, within the scope of the present invention that the switch 9 is fully actuated in timed manner, such that, for example, the incoming signal passing through enabling-signal conductor 12 simultaneously actuates a timer element 13 which allows the switch 9 to retain the mode in which signal flow is not stopped, for a period of time commensurate with the time required for conversion of the signal flow into the identification marking. Upon expiry of the required time period, the timer element 13 sets the switch 9 back to the signal flow preventing mode or condition. The reset conduit 11 will usually be superfluous in the case of timer reset.

In general, in the embodiment shown, the starter label 10 directly precedes each code field 3 in the direction of travel of the web 2 indicated by arrow 1. For generation of the initiating signal a detector 14 is provided, for example, by a proximity switch device, or the like, and this is arranged at the reader head 6. The detector 14 is responsive to the starter label 10.

The starter label 10 extends in lines or bands in transverse direction with respect to the direction of travel indicated by the arrow 1 of the web 2 over the width of the code field 3.

The starter label 10 is preferably provided by a material which is adapted to act as an electric conductor, and/or which is magnetizable, in consideration whether the detector 14 is operating electrically conductive or magnetically inductive. Furthermore, additional starter labels 10' of the type of the first starter label 10 can be repeated in the code field 3 when viewed in the direction of arrow 1.

In the event of a purely time-dependent control of the transmission mode of the switch 9, such control allows a time-constant in the timer element 13 such that this time period is relatively short when compared with the period of time required for the conversion of the signal flow into the identification marking. The signal flow is already then disrupted when the first initiating signal is not followed, during the short time-constant of the timer 13, by the second initiating signal of the subsequent starter label 10'. Thus, the stand-by time of the evaluating logic 7 can be further reduced. Furthermore, due to the repetition of the starter labels 10,10′ it is achieved that such starter labels are consequently arranged at both ends of the code fields 3, when viewed in the direction of arrow 1, so that transmissivity-control of the switch 9, can be carried out independently of the direction of travel, arrow 1, of the web 2.

In a particularly simple manner, such repeating starter labels 10,10′ can be provided such that the code field 3 is formed by a piece of cloth which is connected to the web 2 and in which the starter labels 10,10′ are formed by metal threads or filaments which are woven into the cloth, for example, as warp threads. In such a case particular attention need not be given when cutting out the cloth required for the code fields 3 to the position of the starter labels 10, 10′ with respect to the edges of the cloth piece. On the other hand, when the code field 3 is formed by a plastic/synthetic foil arranged on the web 2, the starter labels 10, 10′ can be formed by lines, bars, or the like, made of a lacquer which is electrically conductive, or a similar layer, or coating which has such conductive properties.

Figure 2:
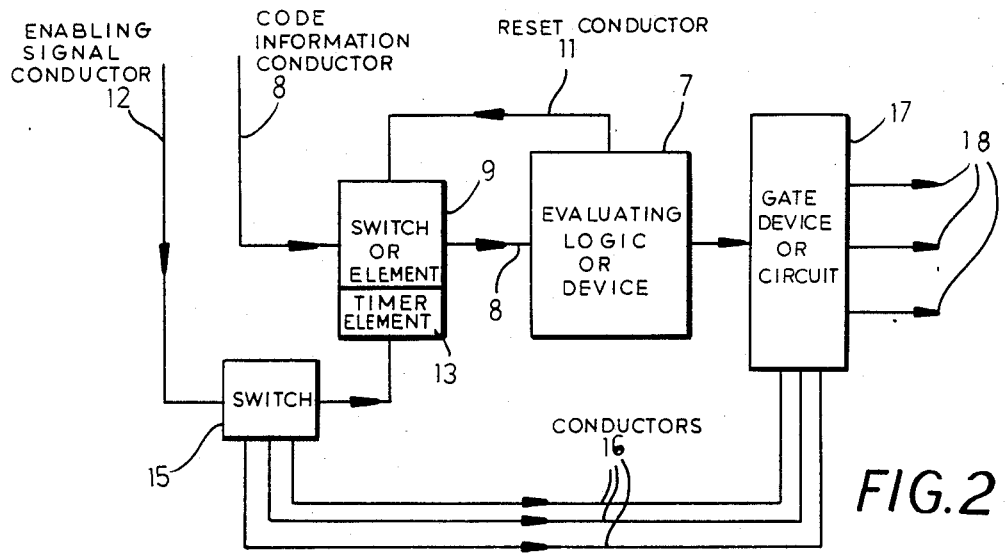
FIG. 2 is a representation of an arrangement which is particularly adapted for a method which employs coded initiating signals.

FIG. 2 shows the embodiment wherein the starter labels 10, 10′ are coded per se and, consequently, the initiating signals generated by them in the detector 14 would be coded. In this embodiment it is assumed that the coding allows differentiation of three initiating signals. Such different event differentiations are then carried out in switch 15 which, in conformity with the type of initiating signal, can assume three switching conditions or modes, and these conditions act via conductors 16 upon a gate device 17, generally referred to as gate circuit, in such a way that the result of the code conversion by the evaluating logic 7 appears at one of the three exits 18 of the gate circuit 17, which exits are arranged in conformity with the type of the initiating signal. It will easily be possible in this manner to multiply the information extent of the base coding in the code field 3 as a function of the number of differentiation options of the initiating signals. As well, such a coding of the starter labels may conveniently serve to distinguish the starter labels from other signal filaments, for example, those used for marking of seams or the like.

Reference in this disclosure to details of the specific embodiments is not intended to restrict the scope of the appended claims, which themselves recite those features regarded as essential to the invention.

We claim:

1. A method of scanning and processing identification marks on a continuously moving material web which carries such marks including codes in the form of code fields arranged on the material web, said method including the steps of:
   providing a starter label for at least one code field at an upstream end thereof in the direction of movement of said web, said starter label being physically different from said material and independent of said one of said code fields and different from the marks thereof;
   positioning a reading device including a reader head and connecting same to an evaluating logic device in such a way with respect to the continuously moving material web that a signal flow is produced at the reader head on passage thereat of at least one code field;
   detecting upon passage of said starter label past said head immediately preceding commencement of passage of the code field at the reader head an initiating signal; and
   enabling said logic device to respond to said signal flow by initiating signal flow between the reader head and the evaluating logic device, with said initiating signal and discontinuing said signal flow when the respective code field has passed said head to thereby cutoff said head from said logic device.

2. The method defined in claim 1 wherein the starter label and the initiating signal are coded with a multiple of the base code contained in a code field.

3. The method defined in claim 1 wherein the starter label extends in the form of at least one line in transverse direction with respect to the direction of travel of the material web and over the width of the respective code field.

4. A method of scanning and processing identification marks on a continuously moving material web which carries such marks including codes in the form of code fields arranged on the material web, said method including the steps of:
   providing a starter label for at least one code field at an upstream end thereof in the direction of movement of said web;
   positioning a reading device including a reader head and connecting same to an evaluating logic device in such a way with respect to the continuously moving material web that a signal flow is produced at the reader head on passage thereat of at least one code field;
   detecting upon passage of said starter label past said head immediately preceding commencement of passage of the code field at the reader head an initiating signal; and
   enabling said logic device to respond to said signal flow by initiating signal flow between the reader head and the evaluating logic device, with said initiating signal and discontinuing said signal flow when the respective code field has passed said head to thereby cutoff said head from said logic device, the starter label being an electrically conductive element, and the detector being formed by an electric contactless proximity switch.

5. The method defined in claim 1 wherein said starting label is magnetic and the detector includes a magnetic contactless proximity switch.

6. The method according to claim 1 wherein a plurality of starter labels are spaced apart in each code field in the direction of travel of the material web.

7. A method of scanning and processing identification marks on a continuously moving material web which carries such marks including codes in the form of code fields arranged on the material web, said method including the steps of:
   providing a starter label for at least one code field at an upstream end thereof in the direction of movement of said web;
   positioning a reading device including a reader head and connecting same to an evaluating logic device in such a way with respect to the continuously moving material web that a signal flow is produced at the reader head on passage thereat of at least one code field;
   detecting upon passage of said starter label past said head immediately preceding commencement of passage of the code field at the reader head an initiating signal; and enabling said logic device to respond to said signal flow by initiating signal flow between the reader head and the evaluating logic device, with said initiating signal and discontinuing said signal flow when the respective code field has passed said head to thereby cutoff said head from said logic device, at least one code field being provided by a piece of fabric connected to the material web, and at least one starter label being formed by at least one metal thread.

8. In a method of detecting identification marks on a continuously moving material web which carries such marks in the form of code fields arranged on the material web, with the aid of a reading device, having a reading head and an evaluating logic whereby a signal flow produced by the reading head on passing therebeneath on the code fields is passed to the evaluating logic and is converted by the evaluating logic into the pertaining identification mark of a respective code field, the improvement wherein a starter marking (10) is associated with each code field (3) and arranged on the material web (2) which produces immediately prior to start of passing of the code field (3) at the reading head (6) to start signal which releases the previously blocked signal flow between the reader head (6) and the evaluating logic (7), and the signal flow is blocked again when the operation of the transformation of the signal flow into the identification mark is concluded, the starter marking (10) extending in the form of a line in transverse direction with respect to the direction of travel (1) of the material web (2) over the width of the code field (3), the starter markings (10,10') in each code field (3) in the direction of travel (1) of the material web (2) being repeated, said code field (3) being formed by a piece of fabric connected to the material web (2), the starter markings (10, 10') being formed by metal threads.

9. A system for scanning and processing information related to a continuously moving material web displaced in a displacement direction, said system comprising:

at least one machine readable code field applied to said web and constituted of code marking identifying said web;

a reading head juxtaposed with said web and responsive to said code markings and provided with signal-processing logic for evaluating information represented thereby;

a start marker carried by said web immediately ahead of said code field in the displacement direction of said web, differing from said code markings and differing physically from the material of said web and both independent of said code field and requiring detection by means other than said reading head; and a detector, independent of said reading head, responsive to said start marker and capable of distinguishing said start marker from said material of said web by the physical difference between said start marker and said material, disposed upstream of said head with respect to said direction and connected to said logic for enabling said logic to respond to said code field and code markings carried by said web only upon detection of said start marker by said detector.

10. The system defined in claim 9 wherein said start marker is a strip extending transversely of said direction and said detector is a contactless electromagnetic detector responsive to the material of said strip.

11. The system defined in claim 10 wherein said strip is a wire woven into the material of said web.

12. The system defined in claim 11 wherein a plurality of such wires are woven into the material of said web ahead of each group of said code markings forming said field.

* * * * *